(12) United States Patent
Cooreman et al.

(10) Patent No.: US 6,698,661 B1
(45) Date of Patent: Mar. 2, 2004

(54) CHIP CARD EQUIPPED WITH A COUNTER DEVICE

(75) Inventors: Pascal Cooreman, Marseilles (FR); Jean-Paul Kirik, Montreal (CA)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/431,655

(22) Filed: Nov. 1, 1999

Related U.S. Application Data

(63) Continuation of application No. PCT/WO98/50893, filed on Apr. 30, 1999.

(30) Foreign Application Priority Data

May 2, 1997 (FR) .............................. 97 04782
Apr. 30, 1998 (WO) .............................. PCT/WO98/48387

(51) Int. Cl.[7] .............................................. G06K 19/06
(52) U.S. Cl. ...................................... 235/492; 235/383
(58) Field of Search ................................. 235/492, 486, 235/480, 382, 382.5, 375, 383; 705/3; 707/3, 1; 712/32

(56) References Cited

U.S. PATENT DOCUMENTS

| | | | | |
|---|---|---|---|---|
| 4,130,867 A | * | 12/1978 | Bachman et al. ............. 707/1 |
| 5,305,196 A | * | 4/1994 | Deaton et al. ................ 705/10 |
| 5,380,991 A | | 1/1995 | Valencia et al. |
| 5,412,790 A | * | 5/1995 | Okamura ...................... 711/3 |
| 5,475,585 A | * | 12/1995 | Bush ......................... 235/380 |
| 5,530,890 A | * | 6/1996 | Moore et al. ................. 712/32 |
| 5,536,923 A | * | 7/1996 | Foglino ...................... 235/380 |
| 5,767,504 A | * | 6/1998 | Menconi ...................... 235/380 |
| 5,930,771 A | * | 7/1999 | Stapp ........................... 705/14 |
| 6,064,994 A | * | 5/2000 | Kubatzki et al. ............. 235/375 |
| 6,360,217 B1 | * | 3/2002 | Gopal et al. ................. 345/751 |
| 6,385,645 B1 | * | 5/2002 | De Jong ....................... 707/100 |
| 6,397,190 B1 | * | 5/2002 | Goetz ......................... 235/375 |

FOREIGN PATENT DOCUMENTS

| | | |
|---|---|---|
| EP | 0157416 | 10/1985 |
| EP | 0640945 A2 | 3/1995 |
| EP | 0658862 A2 | 6/1995 |
| EP | 0736849 A1 | 10/1996 |
| EP | 0775990 | * 5/1997 |
| EP | 0775990 A2 | 5/1997 |
| WO | WO90/15382 | 12/1990 |
| WO | WO95/21428 | * 8/1995 |
| WO | WO98/50893 | * 11/1998 |
| WO | WO00/03362 | * 1/2000 |

* cited by examiner

*Primary Examiner*—Thien M. Le
(74) *Attorney, Agent, or Firm*—Burns, Doane, Swecker & Mathis, L.L.P.

(57) ABSTRACT

In order to render a chip gratuity counter more flexible, the invention consists in recording in the chip card memory a file architecture to facilitate the management of its counters. Said architecture is characterized in that a counter unit file, wherein are located the counters relative to an application, is associated with rules which are applicable thereto. Thus, the simple designation of a counter unit implies the implementation or rules applicable to the counters on the counter unit. The implementation is internal to the chip card and does not require any exchange with the reader. The chip memory further comprises the rules file, the conditions file and the computing file the interaction of which provides greater flexibility of use.

9 Claims, 3 Drawing Sheets

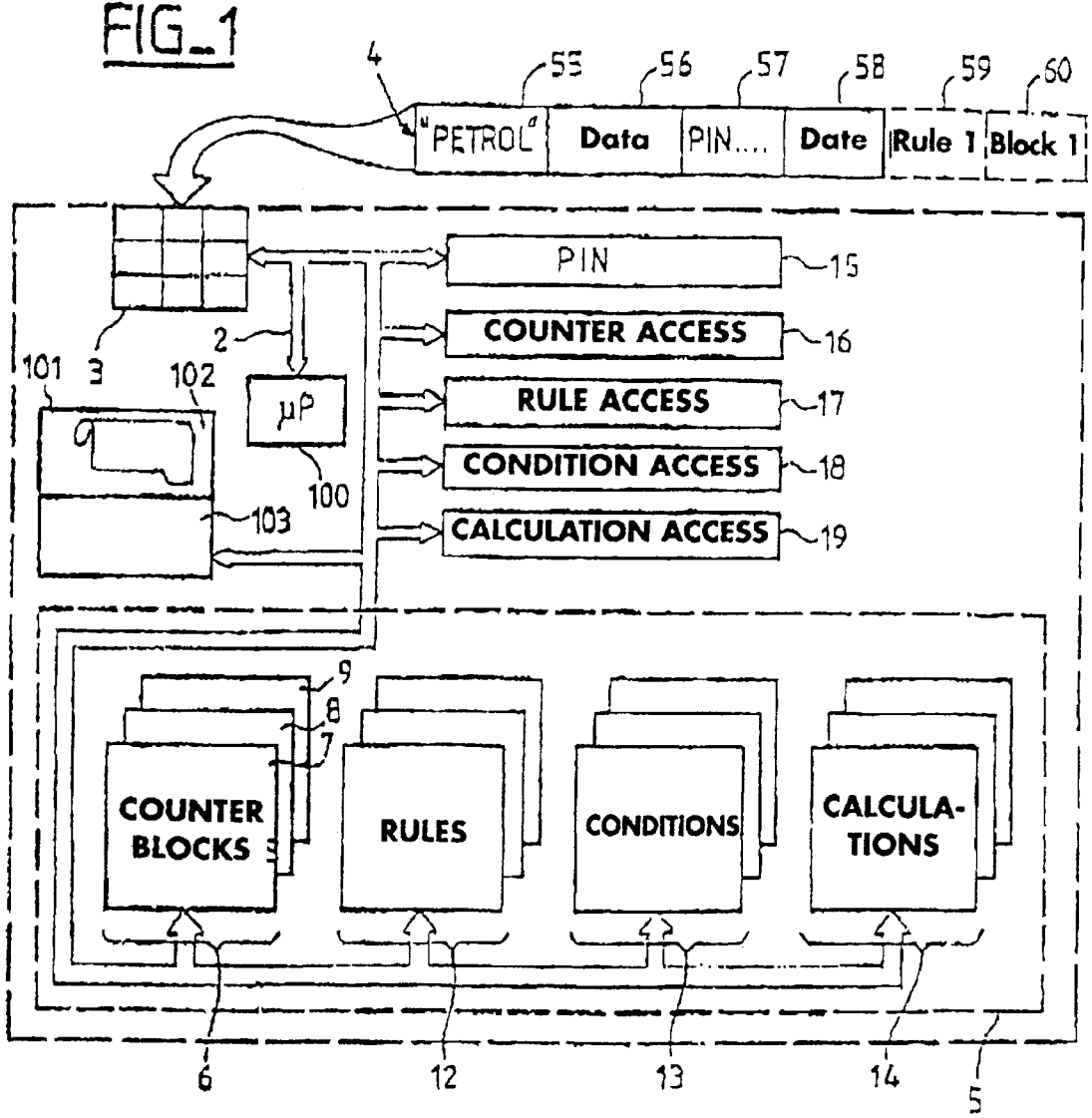
FIG_1
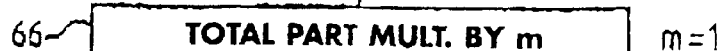
FIG_12

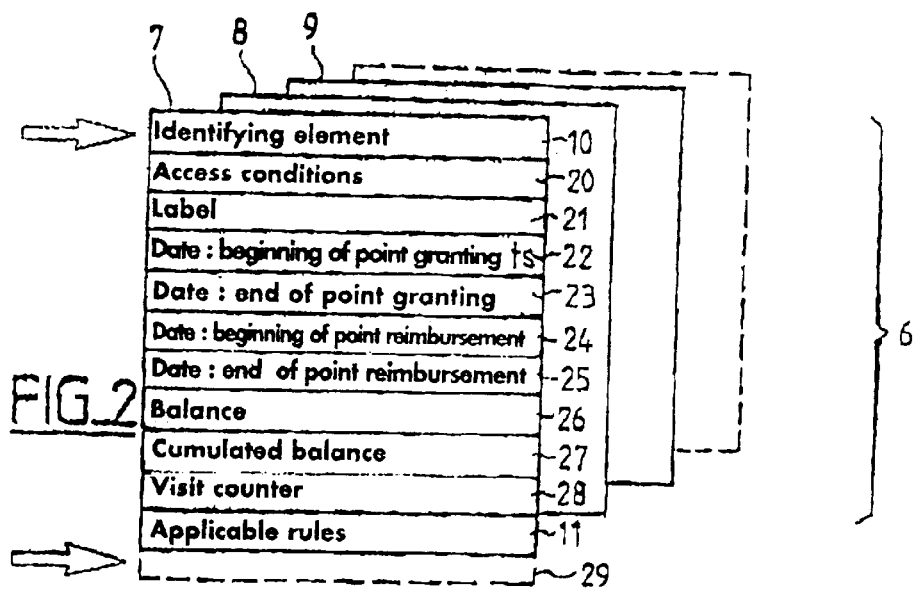
FIG_2
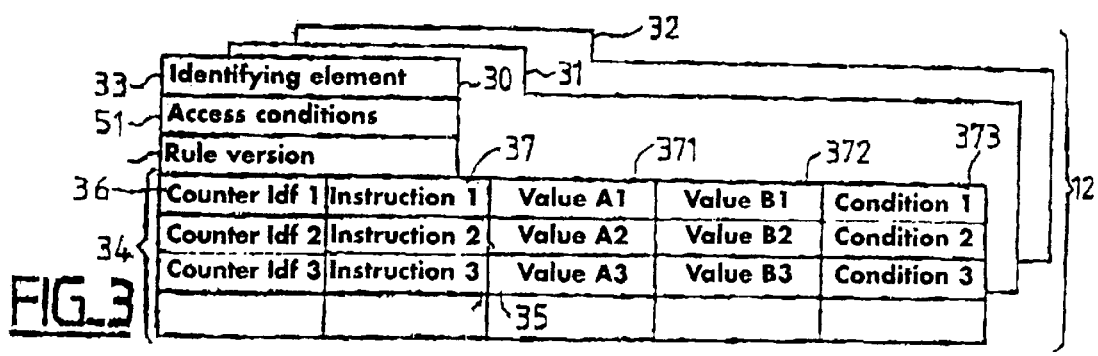
FIG_3
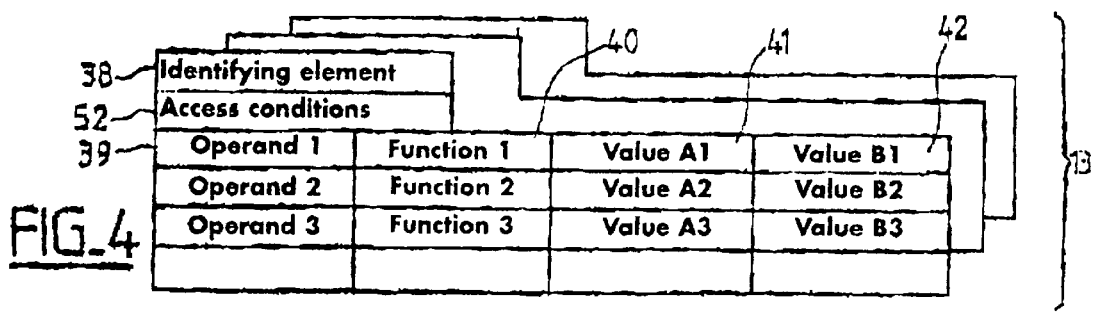
FIG_4
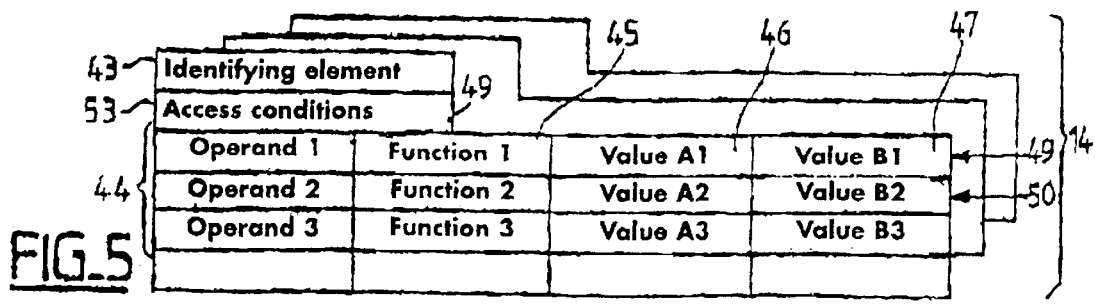
FIG_5

FIG_6

| | | | | |
|---|---|---|---|---|
| RULE 1 | | | | |
| PETROL | | | | |
| Version 1 | | | | |
| COUNTER 1 | CALCULATION 1 | 1 | 50 | Condition 1 |
| COUNTER 1 | CALCULATION 1 | 1 | 25 | Condition 2 |
| COUNTER 1 | CALCULATION 2 | 10 | | Condition 3 |
| COUNTER 2 | CALCULATION 1 | 1 | 30 | |
| COUNTER 3 | CALCULATION 2 | Calcul 1 | [100] | Condition 4 |
| 36 | 37 | 371 | 372 | 373 |

61 — Condition 1 row; 62 — Condition 2 row; 63 — Condition 3 row; 67 — COUNTER 2 row; 68 — COUNTER 3 row

FIG_7

| Condition 1 | | | |
|---|---|---|---|
| PETROL | | | |
| AND | ≤ | 200 | DATA |

41, 42

FIG_8

| Condition 2 | | | |
|---|---|---|---|
| PETROL | | | |
| AND | > | 200 | DATA |

FIG_9

| Condition 3 | | | |
|---|---|---|---|
| PETROL | | | |
| AND | = | 0 | VISIT COUNTER BLOCK 1 |

FIG_10

| Condition 4 | | | |
|---|---|---|---|
| PETROL | | | |
| AND | > | DATE OF BEGINNING OF GRANTING POINTS | Date |
| AND | < | DATE OF END OF GRANTING POINTS | Date |

FIG_11

| Calcul 1 | | | |
|---|---|---|---|
| PETROL | | | |
| CALCULATION | * | VISIT COUNTER BLOCK 1 | 2 |

45, 46, 47, 49

CHIP CARD EQUIPPED WITH A COUNTER DEVICE

This application is a continuation of PCT application No. WO 98/50893, filed on Apr. 30, 1999, which is based on and claim priority to French Patent Application No. 97/05475, filed on May 2, 1997.

BACKGROUND

1. Field of the Invention

The present invention relates to a chip card fitted with a sophisticated counting device. It aims at facilitating the use of chip cards or, more generally, portable objects associated with a chip, in increasingly diversified domains, this utilization becoming more powerful and more rapid.

2. Related Background

In the field of portable objects with chips, the chips are provided with various counters. More conventionally unit counters representative of the units of possible consumption, even money, are known. Bonus counters are also known which count the points of development of the customer's loyalty granted by a service provider to a user. This grant can be made to the prorata of the consumption of a service by a user, the user's visits to an organization, a retailer's, or even his presence in certain places.

The counters can have various shapes. They can be material counters or software counters. A material counter is a counter in which, as for a scoring board, the switching of a counter from an initial state to a final state includes intermediate states representative of the intermediate values between the initial value and the final value. Counting software mainly consists of a recording, a value and an algorithm implemented by a microprocessor. The principle of the modification of counting software consists in reading a date of value by reading the recording, in modifying the data resulting from this reading depending on the algorithm, (in general it is an addition or any other mathematical operation), and in rewriting the new calculated value where it has been recorded. The invention will mainly concern the counting software but it could also apply to the material counters.

For safety reasons, during the counting operation the counter state is transmitted by the chip card to a chip card reader which reads this card. The programs of the reader implement the algorithm and when done, cause the recording of the new value in the memory of the card chip. This solution is very flexible; the readers are provided with an operating system which allow them to fulfill these functions.

However, the disadvantage of this embodiment is that the transaction is slow, numerous verifications are required between the emitter (reader) and the receiver (chip card). In the given field of the contactless card where the electric current is provided to the card by a radioelectrical emission, these numerous exchanges are slow and particularly difficult to implement.

SUMMARY

In the invention, this problem of limiting the number of exchanges is solved by providing the chip card with a recording of rules which associate counters and instructions to modify these counters. Preferably, the chip card is provided with a memory which contains these modification instructions, and a microprocessor which implements them.

Accordingly, the object of this invention is a chip card in which the chip is provided with a counting device comprising at least one counter, characterized in that the counting device includes a file of rules each recording of which includes at least one data sheet associating the identification of a counter with instructions to modify this counter.

BRIEF DESCRIPTION OF THE FIGURES

The invention will be better understood when reading the following description and studying the associated figures. They are given for information only and do not limit the invention. The figures show FIG. 1: a chip card provided with the counting device according to the invention;

FIGS. 2 to 4: a detailed representation of the structure of the files recorded in the counting device of the invention;

FIGS. 6 to 12: the implementation features of the invention in an example.

In the invention, a set of recordings recorded in the memory will be called a file. A set of associated data like a database will be called a recording. Data associations of a recording all having the same structure and syntax will be called a sheet.

FIG. 1 shows a chip card 1 provided with a counting device according to the invention. The chip card 1 includes a microprocessor 100, an addresses and controls data bus 2, and means 3 to contact the external world. Schematically, the means 3 represent here a connector which receives a message 4 from a reader not represented. The link with the reader can moreover be an electrical, radioelectrical, infrared link; it depends on the nature of interface 3.

The card chip includes a counting device 5 which includes at least one counter. The embodiment of this counter will be seen later. In FIG. 2, the counting device 5 preferably includes a file 6 of counter blocks. Each recording 7, 8, 9 or other, of the file 6 associates an identification 10 of a counter block with a list 11 of rules of modification of the counters of this block. FIG. 2 shows a detailed representation of the file 6 and the recording 7. There can be several counter blocks in the file 6. Only three have been schematically represented.

The recording 7 of the counter block, as well as the other recordings essentially include an identifying area 10 and an area 11 of applicable rules. The rules of area 11 can be used on the counter block 7. The aim is to ensure the safety of the counter block 7 by allowing the application of the only rules thus designated.

The identifying element 10 can represent the name of the application (type of utilization of the chip card) which uses the counter block. This identifying element is generally communicated to the card when it is connected to the reader.

According to the invention, the memory card 1 includes a file 12 of rules (FIG. 3). Preferably, it can also include a file 13 of conditions (FIG. 4) and a file 14 of calculations (FIG. 5). The chip also includes in FIG. 1, a set of registers 15 to 19 intended to receive the information, notably some information related to the conditions of access. The registers 15 to 19 as well as the files 6 and 12 to 14 are also connected to microprocessor 100 through bus 2. To do so, the files 6, 12, 13 and 14 are stored in a memory of the chip 1. This memory is here combined with these same files to simplify the explanation. Nevertheless, for this memory or for the memories which contain these files, it is possible to adopt various physical structures: non-volatile memories, backup memories, memories differentiated for each file, or unique memory.

Moreover, an auxiliary memory 101 can contain a program memory 102 and a data memory 103. The microprocessor 100 implements the invention by applying the programs contained in the program memory 102 on the data of memory 103. One of these memories 102 or 103, or both, can be located in the reader circuits. If memory 103 is located in the chip card, it can contain files 6 and 12 to 14 unless the latter are recorded in another memory of the chip card.

In addition to area 10 and area 11, the recording 7 preferably includes an area 20 related to the conditions of access and an area 21 related to a label of the counter block (the name of the counter block). For example, it can also include four date areas 22 to 25, which mention the date on which the granting of bonus points starts, a date on which the granting of bonus points ends, a date to begin reimbursement of these points, and a date to end reimbursement of these points. The block 7 also includes the designation of a certain number of counters. An area 26, called here balance, will include the actual state of the bonus counter, when all the points have been added and subtracted. It can include a cumulated balance 27 representative of the number of points received in the counter block 7 without deducing the reimbursements. Finally, it includes an area 28 to count the visits and adding up the number of times that the balance area 26 has been affected. It can include other areas 29 for other types of counting.

The essential file of the invention is file 12 of the rules, which includes recordings such as 30 to 32. Each recording identified by a rule, designated by an identification area 33, includes a series 34 of files, each file associating a counter with instructions applicable to that counter. Accordingly, each data sheet of a recording of file 12 of rules includes an area 36 of designation, to designate a counter and an instruction area 37 to give information on the mode of modification of the counter to be affected. In area 37, the instructions are generally those of addition or subtraction. Nevertheless any other simple or complicated arithmetic operation could be envisaged.

Each data sheet of a file 12 recording include at least one area, preferably two areas 371, 372, of variables to contain the variables on which the instructions apply. These variables can be variables of date or numerical variables. They can also be references to values contained in other files. For example, they can be addresses of other values. These addresses can be those of areas 26, 27 or 28 of the concerned counter block, or of another block. When a data sheet includes no indication in area 371 and 372, or when a data sheet does not include such areas, the latter which represent the instruction operands which are or can be implicitly contained in the instruction code of the instructions.

Preferably, in addition file 12 recordings include a fifth area 373 of condition, which is a reference area of condition. This area 373 designates a recording of file 13 of conditions to be met to authorize the completion of the instruction.

FIG. 4 shows file 13 of conditions. This file 13 essentially includes, in each recording, an identifying area 38 and a list of composed data sheets of conditions. Each data sheet of condition includes an operator area 39 which shows how to compose the conditions of the various data sheets of a recording, a function area 40 to represent a logical condition, and at least two areas 41 and 42 to respectively contain a reference value of the condition and a value to be tested in relation to the reference value according to the logical condition of area 40.

Preferably, the card 1 of the invention also includes a calculation file 14, FIG. 3, each recording of which includes an identifying area 43 and a set of calculation data sheets 44.

Each sheet used to record the calculation includes a function area 45 to represent an elementary mathematical function, at least one area, preferably two areas 46 and 47, to contain one or more operands of the elementary mathematical function, and an area 48 called data sheet operator to indicate how the result of a calculation data sheet 49 must be taken into account for a calculation with a following data sheet 50. The result of the calculation of all the data sheets 44 is intended to replace a value (371 or 372) within a rule recording 12, a value 41 within a condition recording 13, or a value 46 or 47 within a calculation recording 14.

Preferably, like file 6, files 12, 13 and 14 include an area that condition access, respectively 51 to 53 in each recording. In addition, the recordings of file 12 will preferably include an area 54 of rule version allowing the identification of the recent nature of the implemented rule.

FIGS. 6 to 12 show an arbitrary but complete method of utilization and organization of files 6, 12, 13 together.

As shown in FIG. 6, a scenario, Rule 1, has been chosen which corresponds to a recording of the file 12. In this scenario, within a given loyalty program, when the customer's purchases are within the FRF 0 to 200 bracket, a bonus point is granted to him per FRF 50 purchase. A customer who buys for more than FRF 200, will be granted one point per FRF 25 purchase. In addition, if this is his first visit, his bonus point counter will receive 10 welcome points.

Let us assume that the supplier is a fuel supplier which identifies its application by a PETROL code transmitted to an area 55 of message 4. Let us also assume that the data present in an area 56 of the message 4, represent 180 for a FRF 180 purchase. Message 4 also includes an identification 57 of the owner by its Personal Identification Number (PIN), typed by the chip card owner on a keyboard. Finally, the message 4 includes the date of the transaction in area 58, as far as this date is useful for the rule and as card 1 is not able to produce it independently. Message 4 includes an area 59, the designation of an applicable particular rule "Rule 1", and/or as an alternative the designation of a counter block "Block 1" to which the rules must be applied. As will be seen later, this is not necessary.

Message 4 arrives through interface 3 and bus 2 in microprocessor 100.

According to the invention, from the identification of the rule "Rule 1", present in area 59, the microprocessor will look in area 33 to find the recordings which have Rule 1 as identification. It is also possible to verify that the recordings found in area 51 are linked by a condition of access, for example PETROL. The condition of access can be different from PETROL if a different password has been chosen for the application. In this case, this password must be included in message 4 (unless it can be deduced by the microprocessor from the application identifying element). In file 12, the microprocessor 100 will take only recording 30 which includes Rule 1 as identification in area 33 and PETROL code in area 51 at the same time, in the conditions of access. This is represented in FIG. 6.

As an alternative, if message 4 includes an area 60 designating the counter block, Block 1 of file 6, the microprocessor 100 will look for the recording whose identifying element in area 11 corresponding to "Block 1" a designated in the area 60. In this case, the designation of the counter block can generate the application of all the applicable rules designated in the area 11 of the recording 7 if the area 59 is blank.

Finally, if only the PETROL condition of access is given, the microprocessor 100 will keep all the counters blocks and/or all the rules corresponding to this condition of access.

Practically speaking, it is therefore possible to implement the invention from the identification 55 of the application alone, from the designation of the rule in the area 59 or from the designation of the counter block, in the area 60, or from any combination of these three elements.

In the case shown in FIG. 6, disregarding for a moment the version of the rule memorized in file 13 five instruction data sheets 61, 62, 63, 67 and 68 appear. In the first three cases, counter 1 which is the concerned counter will be the counter recorded in area 26 of the counter block 7. This could have been the counter recorded in area 27 or area 28, or even a counter recorded in another block. The designation in area 36 is either sufficient or completed by area 60 of the message 4.

The type of instruction 37 in each of the first three cases will be a type 1 addition. This is an example. For each set of instructions, the value to be added will depend on the arguments given in both following areas 371 and 372. As an example, FIG. 12 shows the type 1 operation of addition. In the example, this operation of addition includes micro-instructions 64 to divide the data of area 56 of message 4 by n. Value n is the content of area 372. In the example where the data value was 180, and where n is 50, the division of 180 by 50 gives 3 with a remainder of 30. In the following micro-instructions 65, only the whole part of the division is taken into account. Therefore the result is 3. With the following micro-instructions 66, this intermediate result 3 is multiplied by value m. Value m is the value stored in area 371 of the recording 61. Here, m is 1. Accordingly the result to be added is 3. Consequently, the application of the instructions Addition 1 on counter 1 will consist in adding 3 additional points.

For data sheet 62, the values n and m are now respectively 25 and 1. Taking into account the value of the purchase, lower than FRF 200, this rule does not produce any additional bonus points.

Indeed, both data sheets 61 and 62 are conditioned by condition 3 and condition 2 respectively indicated in area 373. In area 373, a data sheet of rule includes an identifying element of a recording of the file 13 of conditions which will be used. For data sheet 61, condition 1 is represented in FIG. 7. The operand of composition of the conditions between themselves is a logical AND. When there is only one condition, the operand of composition is always a logical AND. In FIG. 10 the composition of the operands of logical composition will be seen. The function of condition 1 is a comparison with a "lower than or equal to" meaning in the above scenario. The result of the comparison is positive if the value designated in area 42, here data 180, is lower than or equal to the value designated or presented in area 41. Area 41 is the area of reference of the condition. Here it includes value 200. Area 42 preferably includes the value to be tested. The input data which is concerned here is the FRF 180 of the purchase. Practically speaking, the information in area 42 is the address of the place where the value of FRF 180 of message 4 is stored. As condition 1 is met since 180 is lower than 200, the data sheet 61 can be completed.

FIG. 8 shows condition 2 of application of data sheet 62 of Rule 1. Since the purchase is lower than FRF 200, and condition 2 being that this purchase is higher than FRF 200, the condition is not met. Then instruction data sheet 62 is not executed.

Instruction data sheet 63 includes a condition 3 shown in FIG. 9. This condition 3 consists in comparing the content of the visit counter of Block 1, in area 28 of the recording 7, to the value 0 present in the area 41. At the beginning, when the visit counter is null, this condition is met and an instruction 63 can be executed. This instruction is an addition different from the addition presented in FIG. 12. Addition 2 is a simple addition. It consists in adding the content of the area 371 of the recording 68, here value 10, to the counter designated in the area 26 of the Block 1.

Depending on the type of designated operations, Addition 1 or Addition 2, the operands of the calculation or the result itself can be stored in various places or in the instructions.

At the end of these three operations, counter 1 in area 26, for a FRF 180 purchase, will include a result 132.

In a still more complicated application, the fuel supplier can be associated with another service provider, for example a fast-food chain or a cinema distribution company. Under these conditions it is possible, for any purchase made to the first one, the fuel supplier to grant a certain number of points in a counter of the second one, that of the fast-food chain for example. This is shown in data sheet 67.

In this case, the concerned counter will be a counter different from the one indicated in the area 26 of the recording 7. It may be the main counter of the recording 8. It can be decided that this other counter, counter 2 (data sheet 67) will undergo a type 1 addition, Addition 1, with an increment of 1 (area 371) for each section whose value is indicated in area 372: FRF 30. Under these conditions, values n and m of FIG. 12 are respectively 30 and 1. This means that, for each FRF 30 purchase, counter 2 receives one point. For data sheet 67, there is no condition; it is executed anyhow.

The counter designation, counter 2, is here contained in the rule recording, Rule 1. Nevertheless, the message in area 60 can designate counter block Block 1 and recording 7 related to the counter block sends back to Rule 1 in area 11 to complete the designation of counter 26 (or any other).

Similarly, Rule 1 can also includes the designation of a counter 3 in a data sheet 68. Counter 3 receives the result of a type 2 addition (simple addition). The arguments of the type 2 addition are not definitely designated here. They result from the application of a calculation recorded on a data sheet of a recording of the calculation file 14. The calculation designated in the recording is Calculation 1. A calculation recording comprising "Calculation 1" as an identifying element in area 43 is shown in FIG. 11.

In FIG. 11, the type of operation 45 implemented in the example is a multiplication. Its first operand designated in area 46 is the content of visit counter of counter block 1. It is practically the state of area 28. The second operand of the multiplication designated in area 47, here 2, can be a fixed digit. It could also be an unknown quantity. In the example, as an incentive for people to come back more often it has been decided to count more points than they have come. This count can thus be exponential. For example, the state of the visit counter 28 of somebody who will have come 25 times will be 25. The result of calculation 1 will then be 50. Since area 48 which is the data sheet operator includes the designation of an addition, this means that result 50 of the data sheet calculation will have to be added to the calculation resulting from the following data sheet. Since there is no following data sheet, the final result of the calculation will be 50. If there had been other data sheets in the recording of FIG. 11, they would have been combined together (multiplication, addition, exponentiation, . . . ) according to the direction of the data sheet operator. In other words, recording 68 will result in the addition of value 50 in the counter 3. Counter 3 is a counter of the counter block of the recording 8. It corresponds to the fast-food chain.

It also would have been possible to add the 50 points in counter 1. In this case counter 1 should have been designated in area 36.

Instruction data sheet 68 is subjected to a condition, condition 4. The latter is shown in FIG. 10. It indicates that finally this type of incrementation will be possible only if the date is included between the dates provided for the beginning and the end of the granting bonus points operation.

FIG. 10 shows, with condition, 4 how the operators of condition combination can co-operate (AND/OR type or Exclusive OR type, . . . ). Both sheets of conditions must be met since the combination operators are both AND.

As regards data sheet 68, in addition to condition 4, the result 50 of the calculation (Calculation 1) could have been multiplied by a number of FRF 100 sections with a type 1 addition (Addition 1). Small purchases by the users could be avoided. In this case, value 100 (shown here surrounded with dots) would appear in area 372. Then value 100 for n and value 50 for m would have been retained by applying instructions 68 resulting from the application of Calculation 1.

Logical functions 40 which represent the conditions of file 13 can be the functions higher than, than, higher than or equal to, smaller than, smaller than or equal to, equal to, different from, or other than. Functions 45 of the operations of calculation of the file 14 can preferably be addition, subtraction, division, multiplication, exponentiation, the production of a random number, or others.

When message 4 reaches the chip of card 1, the identification of the PETROL application can be declined to fill the registers 15 to 18 which set the conditions of access to the files 6 and 12 to 14. These conditions of access can obviously be used every time the use of a file has to be linked to the presence of information identical to that mentioned in the recordings of files 6 and 12 to 14 in one of the corresponding registers 15 to 18.

Moreover these conditions of access can also be used to allow the modification of the recordings of files 6 and 12 to 14. Accordingly the modification of recording 7 will be undertaken only if the conditions of access, in modification, mentioned in area 26 of recording 7 are identical to the data stored in register 16 (and which have been more or less transmitted by message 4). The same applies to the modifications of the recordings of files 12, 13 and 14 for which the contents of areas 51, 52, 53 must be respectively identical to the content of registers 16, 18 and 19.

This same secret code identification is not necessarily recorded in each of registers 16 to 19. Different secret codes have been provided for making the management of this file architecture more flexible and more powerful. Also it is not necessary to meet the condition of access to implement the elements of a file: utilization of a condition, implementation of a calculation, etc.

Practically, the information can be organized elsewhere than in the four files 6 and 12 to 14. Notably files 12, 13 and 14 can be concatenated, the condition recording being for example directly located in area 373. This is notably possible if the conditions of access and identification are the same.

The version of the rule enables the reader linked to card 1 to determine whether a rule has been updated or if this updating must be done prior to the execution of the rule. This updating is of a known type.

Thus, according to the invention, to make the management of the bonus counter of a card more flexible, it is decided to record an architecture of files in the memory of the chip card for easy management of its counters. According to that architecture, a file of rules, where the rules related to an application are located, is associated with counter blocks. Accordingly, the simple designation of a rule involves the modification of the counters of this counter block or vice versa. This implementation is internal to the chip of the chip card. It requires no exchange with the reader.

What is claimed is:

1. A chip card, comprising:
   a counting device having at least one counter; and
   a memory for storing files associated with the at least one counter,
   wherein the memory includes at least one rules file associated with a particular counter, the rules file including
      a designation area identifying the counter associated with the rules file;
      an instruction area specifying the operation of the counter identified in the designation area; and
      a variable identification area specifying the variable of the counter identified in the designation area.

2. A chip card according to claim 1, wherein the instruction area includes and instruction to record the conditions that initiate the application of an instruction.

3. A chip card according to claim 1, wherein a rules file associated with a first counter of the chip card includes a designation area identifying a second counter of the chip card, an instruction area specifying the operation of the second counter, and a variable identification area specifying a variable of the second counter.

4. A chip card according to claim 3, wherein the instruction area of the first counter includes and instruction to record the conditions that initiate the application of an instruction associated with the second counter.

5. A chip card according to claim 3, wherein the rules file associated with the first counter includes a condition file including:
   an operand area specifying instructions associated with the second counter;
   a function area specifying a logical instruction relating to the use of the rules file associated with the first counter to an instruction associated with the second counter; and
   at least two variable areas to respectively contain a reference value of a condition resulting from the application of the logical instruction of the function area.

6. A chip card according to claim 1, wherein the rules file further includes a calculation file, the calculation file further including:
   a function area specifying a mathematical function;
   at least one variable area containing an operand of the mathematical function; and
   an operand area specifying instructions relating to the result of the mathematical function.

7. A chip card according to claim 3, wherein the rules file further includes a calculation file, the calculation file further including:
   a function area specifying a mathematical function;
   at least one variable area containing an operand of the mathematical function; and
   an operand area specifying instructions relating to the result of the mathematical function.

8. A chip card according to claim 1, wherein the rule file further includes a version area specifying the version of the rule file.

9. A chip card according to claim 3, wherein the rule file further includes a version area specifying the version of the rule file.

* * * * *